Oct. 23, 1962

A. N. STANTON 3,059,519

HEADGEAR MOUNTED CATHODE RAY TUBE AND
BINOCULAR VIEWING DEVICE

Filed Sept. 5, 1956

Austin N. Stanton
INVENTOR

Wm. T. Wofford

BY

ATTORNEY

Oct. 23, 1962
A. N. STANTON
3,059,519
HEADGEAR MOUNTED CATHODE RAY TUBE AND
BINOCULAR VIEWING DEVICE
Filed Sept. 5, 1956
3 Sheets-Sheet 2
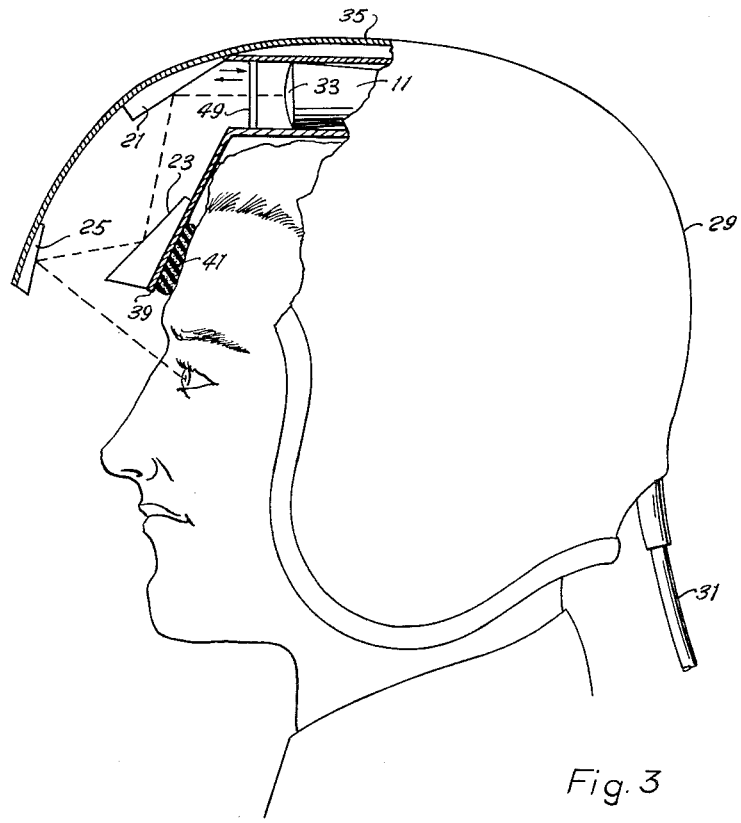
Fig. 3
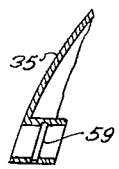
Fig. 8
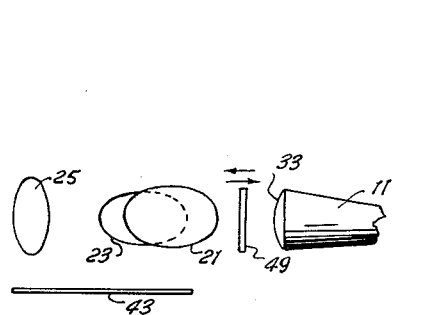
Fig. 4
Austin N. Stanton
INVENTOR
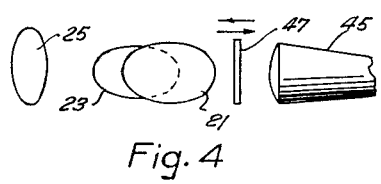
BY
ATTORNEY Oct. 23, 1962

A. N. STANTON 3,059,519

HEADGEAR MOUNTED CATHODE RAY TUBE AND
BINOCULAR VIEWING DEVICE

Filed Sept. 5, 1956

Austin N. Stanton
INVENTOR

BY Wm. T. Wofford

ATTORNEY

United States Patent Office 3,059,519
Patented Oct. 23, 1962

3,059,519
HEADGEAR MOUNTED CATHODE RAY TUBE
AND BINOCULAR VIEWING DEVICE
Austin N. Stanton, Garland, Tex., assignor to Varo, Inc.
Filed Sept. 5, 1956, Ser. No. 608,030
1 Claim. (Cl. 88—1)

My invention relates to visual information presentation devices and arrangements, and more particularly to such presentation devices associated with the headgear of a wearer.

Developments in the speed and complexity of modern military aircraft have made the task of the pilot increasingly difficult to such an extent as to approach the limit of his physical capability. One significant problem has been that of presenting visual information derived from remote sources to the pilot's eyes in such manner that his attention and alertness to the field of vision outside the aircraft is not deleteriously affected.

It is accordingly the general object of my invention to provide an arrangement for presentation of visual information derived from a remote source to the eyes of a pilot in such manner that his perception with respect to the field of vision outside the aircraft will be affected to a minimum degree.

It is another object of my invention to provide for binocular presentation of visual information derived from a remote source to the pilot with minimum interference with the pilot's normal vision.

It is another object of my invention to provide a system for binocular presentation at infinite focus of visual information derived from a remote source to the pilot which presentation will be located just above his normal line of vision at convenient viewing distance from his eyes.

It is another object of my invention to provide a system for presentation of visual information derived from a remote source to a pilot's eyes, wherein the viewing screen shall be located on a visor-like portion of the pilot's headgear just above his normal line of vision.

These and other objects are effected by my invention as will be apparent from the following description taken in accordance with the accompanying drawing, forming a part of this application, in which:

FIG. 3 is a cut-away view of a pilot's helmet incorporating my invention and showing a schematic side elevational view of the presentation arrangement in accordance with another embodiment of the invention;

FIG. 4 is a schematic plan view of the presentation arrangement of FIG. 3;

FIG. 8 is a detail section view showing a further modification of the invention.

Figure 1:
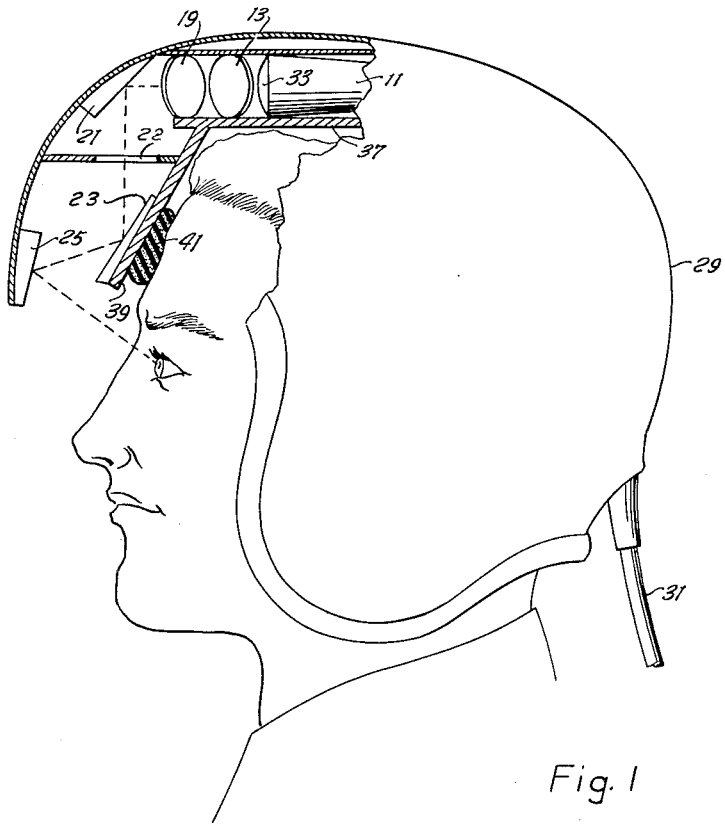
FIG. 1 is a cut-away view of a pilot's helmet incorporating my invention and showing a schematic side elevational view of the presentation arrangement in accordance with a preferred embodiment of the invention.
Figure 2:
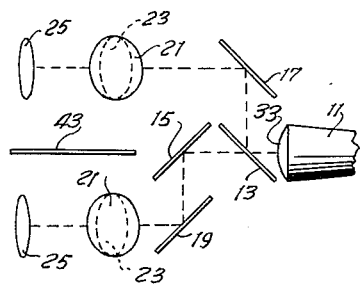
FIG. 2 is a schematic plan view of the presentation arrangement of FIG. 1.

All of the elements of the presentation system of FIG. 1 can be seen in FIG. 2. These elements are a cathode ray tube 11, an image splitter, right eye channel elements, and left eye channel elements. The image splitter comprises a semi-reflecting mirror 13 and first, second, and third full reflecting mirrors 15, 17, 19. The elements of each eye channel are fourth, fifth, and sixth full reflecting mirrors 21, 23, 25, and a lens 22. FIG. 1 shows the presentation system mounted entirely within a pilot's headgear 29. The visual information derived from a remote source (not shown) such as a television camera or radar apparatus reaches the presentation system via a cable 31 which is attached to the pilot's headgear. Power for operating the cathode ray tube 11 may be supplied via the same cable or another cable from a suitable source (not shown). The cathode ray indicator is a miniature device having a screen diameter of about one inch and a length of about four inches. The central axes of the cathode ray tube screen 33, and the image splitter elements are arranged to lie in a common plane. The top portion of the pilot's headgear has an outer wall 35 and an inner wall 37. The inner wall conforms generally to the pilot's head except for a front portion 39 which is a plane surface sloping downwardly and forwardly in front of the pilot's forehead. A pad 41 is fixed to the inner surface of this front portion and serves to cushion a part of the headgear weight on the pilot's forehead. The elements of the presentation system are supported in a suitable manner by one or both of the headgear walls. The visual information to be presented is caused to appear on the screen 33, or face, of the cathode ray tube 11. The centers of the cathode ray tube screen 33, the semi-reflecting mirror 13, and the first full reflecting mirror 15 are aligned. The semi-reflecting mirror 13 is tilted counterclockwise 45° with respect to the cathode ray tube screen 33 in a plane perpendicular to the plane of the central axes of the image splitter elements, while the first full reflecting mirror 15 is tilted clockwise 45° with respect to the cathode ray tube screen 33 in a plane perpendicular to the plane of said last mentioned central axes. The second full reflecting mirror 17 is parallel to and aligned with the semi-reflecting mirror 13 and on one side of the central axis of said screen, while the third full reflecting mirror 19 is parallel to and aligned with the first full-reflecting mirror 15 and on the other side of the central axis of the screen. For clarity, the second full-reflecting mirror 17 will be designated as being a part of the right-eye channel for the system and the third full-reflecting mirror 19 will be considered a part of the left eye channel. The central axes for the second, fourth, fifth and sixth full-reflecting mirrors 17, 21, 23, 25 for the right eye channel lie in a common plane which is perpendicular to the plane of the axes of the image splitter elements. The central axes for the third, fourth, fifth, and sixth full-reflecting mirrors 19, 21, 23, 25 for the left eye channel lie also in a common plane which is parallel to that of the axes of the right eye channel elements and separated therefrom by a normal inter-ocular distance. The fourth full-reflecting mirror 21 for the right eye channel is aligned with the second full-reflecting mirror 17, while the fourth full reflecting mirror 21 for the left eye channel is aligned with the third full-reflecting mirror 19. Light from the screen 33 passes through the semi-reflecting mirror 13 to the first full-reflecting mirror 15 where it is reflected to the third full-reflecting mirror 19 and then to the fourth full-reflecting mirror 21 for the left eye channel. At the same time, light from the screen 33 is reflected by the semi-reflecting mirror 13 to the second full-reflecting mirror 17 where it is reflected to the fourth full-reflecting mirror 21 for the right eye channel. Thus the visual information on the screen is transmitted in two channels and appears as an image on the fourth full-reflecting mirror 21 for each channel. The fourth full-reflecting mirror 21, and the fifth full-reflecting mirror 23 are aligned for each channel, and the fifth and sixth full-reflecting mirrors 23, 25 are aligned for each channel. Now the fourth full-reflecting mirror 21 is tilted to make equal angles with the axis of alignment of the second and fourth mirrors 17, 21 and the axis of alignment of the fourth and fifth mirrors 21, 23; the fifth mirror is tilted to make equal angles with the axis of alignment of the fourth and fifth mirrors 21, 23 and the axis of alignment of the fifth and sixth mirrors 23, 25; and the sixth mirror 25 is tilted to make equal angles with the axis of alignment of the fifth and sixth mirrors 23, 25 and the axis of alignment of the sixth mirror 25 and the pilot's eye. The fifth mirror 23 lies below the fourth mirror 21 while the sixth mirror 25 lies slightly below and in front of the fifth mirror 23. Thus the images which appear on the fourth mirror 21 are transmitted for each channel to the fifth and sixth mirrors 23, 25 and to the pilot's respective eyes. The lens 22 for each channel is disposed between the fourth and fifth full-reflecting mirrors 21, 23, so that the lens central axis coincides with the axis of alignment of said mirrors 21, 23. Binocular vision is achieved by the inherent action of the image splitter, and because the visual information source is located at the focus of the lens 22, light arrives at the pilot's eyes in parallel rays, giving the sensation of infinite focus. A partition 43 divides the pilot's line of sight between his eyes and the sixth mirror 25 so that the pilot's right eye sees only the sixth mirror for the right channel, while his left eye sees only the sixth mirror for the left channel. Consequently the pilot is able to conveniently view the visual information appearing on the screen by raising his eyes slightly above his normal line of sight. The pilot can alternately view the outside world and the presentation without the necessity of re-focusing his eyes each time. The presentation system provides for transmission of visual information derived from a remote source to the pilot while affecting his perception with respect to the field of vision outside the aircraft to a minimum degree.

The embodiment of my invention shown by FIGS. 3 and 4 is substantially identical to that of FIGS. 1 and 2 except that an additional cathode ray tube 45 and two variable lenses 47, 49 are substituted for the image splitter system. The reference numerals in FIGS. 3 and 4 are the same as those of FIGS. 1 and 2 for corresponding elements. In the embodiment of FIGS. 3 and 4, the cathode ray tube 11 and the variable lens 49 for the right eye channel are aligned with the fourth mirror 21 for that channel, and the cathode ray tube 45 and the variable lens 47 for the left eye channel are aligned with the fourth mirror 21 for that channel. Thus in the embodiment of FIGS. 3 and 4 the optical systems for the right eye and the left eye channels are entirely independent. Identical visual information is presented on the screen of each cathode ray tube and is transmitted in the separate channels to the pilot's eyes. The variable lens in each case serves to project the image at infinity, and is made adjustable to accommodate the eyes of the individual pilot. The lens adjustment may be accomplished by any of the several well known, suitable means (not shown). The arrangement of FIGS. 3 and 4 has the advantage of less light intensity loss in the system, but is some bulkier than the arrangement of FIGS. 1 and 2. Since the entire system in both embodiments is shielded from direct outside light rays and shaded from ambient outside light, the brightness of the finally presented images is significantly enhanced. If desired, provisions can be made to vary the intensity of the presented images in accordance with the outside ambient light level.

Figure 5:
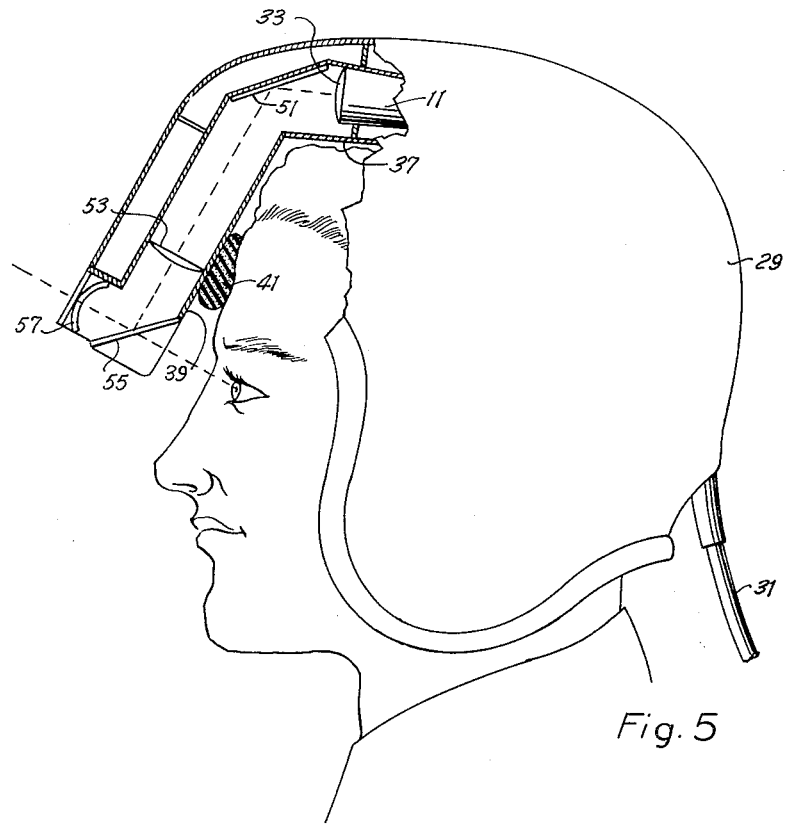
FIG. 5 is a cut-away view of a pilot's helmet incorporating my invention and showing a schematic side elevational view of the presentation arrangement in accordance with a further embodiment of the invention.
Figure 6:
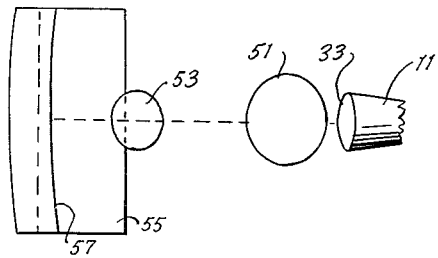
FIG. 6 is a schematic plan view of the presentation arrangement of FIG. 5.
Figure 7:
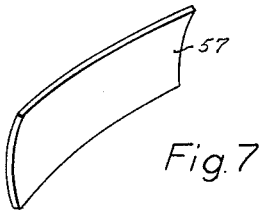
FIG. 7 is a perspective view of one of the optical elements of FIG. 5.

In the embodiment shown by FIGS. 5, 6 and 7, a single cathode-ray tube 11 is used. The optical elements are a full-reflecting mirror 51, a lens 53, a semi-reflecting mirror 55, and a parabolic reflector 57. The image appearing on the cathode ray tube face 33 is transmitted to the lens 53 by the full reflecting mirror 51 which is disposed to make equal angles with the axis of the cathode ray tube 11 and the axis of the lens 53. The semi-reflecting mirror 55 is disposed so as to make a 45° angle with both the axis of the lens 53 and the axis of the parabolic reflector 57. The full reflecting mirror 51 is disposed immediately forward of the cathode ray tube screen 33; the lens 53 is disposed below and forward of the full-reflecting mirror 51; the semi-reflecting mirror 55 is disposed below and slightly forward of the lens 53; and the parabolic reflector 57 is disposed slightly above and forward of the semi-reflecting mirror 55. The central axis of the parabolic reflector 57 coincides with a convenient line of sight of the pilot's eyes as he looks upward. The combination of the lens 53, semi-reflecting mirror 55, and parabolic reflector 57 act to cause the image at the lens 53 to appear as though it were at the focus of the reflector 57. The light rays emanating from the reflector and transmitted to the pilot's eyes travel in parallel lines, thus giving to the pilot the sensation of infinite focus and depth perception.

FIG. 8 shows how the mirror 25 of either FIG. 1 or FIG. 3 may be replaced by a semi-reflecting mirror 59 acting as a window in the helmet, so that the wearer may see the presentation on the semi-reflecting mirror 59, and also at the same time may see through the mirror to the outside world.

The foregoing disclosure and the showings made in the drawings are merely illustrative of the principles of my invention and are not to be interpreted in a limiting sense.

I claim:

A presentation device comprising a cathode ray tube mounted within a wearer's headgear and adapted for receiving visual information derived from a remote source, a reflector mounted within said headgear just above the wearer's normal line of vision, and an optical system including an image splitter interposed between the screen of said tube and said reflector for transmitting separate images of the visual information from said screen to said reflector in parallel rays to provide the effect of binocular vision at infinite focus to the wearer when the wearer views said reflector.

References Cited in the file of this patent

UNITED STATES PATENTS

| | | |
|---|---|---|
| 1,610,553 | Jones | Dec. 14, 1926 |
| 2,341,391 | Shipman | Feb. 8, 1944 |
| 2,388,170 | McCollum | Oct. 30, 1945 |
| 2,426,184 | Deloraine et al. | Aug. 26, 1947 |
| 2,462,468 | Clark et al. | Feb. 22, 1949 |

FOREIGN PATENTS

| | | |
|---|---|---|
| 241,921 | Great Britain | June 10, 1926 |
| 498,167 | France | Oct. 8, 1919 |